United States Patent [19]

Wistüba et al.

[11] Patent Number: 4,563,866
[45] Date of Patent: Jan. 14, 1986

[54] MULTI-ROW CORN CUTTER FORAGE HARVESTER AND/OR PICKER FORAGE HARVESTER

[75] Inventors: Eberhard Wistüba, Rettenbach; Martin Nüsser, Niederstotzingen; Xaver Lenzer, Kötz, all of Fed. Rep. of Germany

[73] Assignee: Karl Mengele & Söhne, Günzburg, Fed. Rep. of Germany

[21] Appl. No.: 608,500

[22] Filed: May 9, 1984

[30] Foreign Application Priority Data

May 9, 1983 [DE] Fed. Rep. of Germany ....... 3316966

[51] Int. Cl.$^4$ ...................... A01D 73/00; A01D 69/00
[52] U.S. Cl. ......................................... 56/228; 56/13.4
[58] Field of Search ................... 56/228, 15.6, 13.4; 474/100, 140, 144, 145, 146, 147

[56] References Cited

U.S. PATENT DOCUMENTS

| 2,862,569 | 12/1958 | Strunk | 474/144 |
|---|---|---|---|
| 4,058,958 | 11/1977 | Sadler et al. | 56/15.6 |
| 4,149,426 | 4/1979 | Rosbak et al. | 474/100 |
| 4,212,147 | 7/1980 | Werner | 56/228 |
| 4,441,305 | 4/1984 | Lippi | 56/228 |

FOREIGN PATENT DOCUMENTS

| 692899 | 8/1964 | Canada | 56/15.6 |
|---|---|---|---|
| 2116583 | 4/1971 | Fed. Rep. of Germany . | |

Primary Examiner—John J. Wilson
Assistant Examiner—David L. Tarnoff
Attorney, Agent, or Firm—Toren, McGeady, Stanger, Goldberg & Kiel

[57] ABSTRACT

A multi-row corn cutter forage harvester and/or picker forage harvester, such as a forage harvester of the disc-wheel type, includes a first support bar arranged to be mounted on the three-part attachment linkage of a tractor. A second support bar, which mounts the harvester device, is connected to the first support bar by a swivel hinge. The second support bar can be pivoted relative to the first bar between a first position extending laterally outwardly from the first support bar and a second position where the second support bar is located behind the first support bar. In the first position, the harvesting device can be operated, while in the second position it is arranged for transport. It could be possible to operate the harvesting device in the second position. A belt drive for the harvesting device extends from a first pulley mounted on the first support bar to a second pulley mounted on the second support bar. The belt running between the pulleys is secured by a web and bracket arrangement to each of the first and second support bars. In the second position, the belt is folded over between the first and second support bars and remains held in place by the web and bracket arrangement.

7 Claims, 2 Drawing Figures

MULTI-ROW CORN CUTTER FORAGE HARVESTER AND/OR PICKER FORAGE HARVESTER

SUMMARY OF THE INVENTION

The present invention is directed to a multi-row corn cutter forage harvester and/or picker forage harvester, such as a forage harvester of the disc-wheel type, comprising a first support bar arranged to be connected to the three-point attachment linkage of a tractor so that the support bar extends transversely of the normal travel direction of the tractor. A second support bar, mounting the harvesting device, is pivotally connected to the first support bar by a lockable swivel hinge so that the second support bar can be moved between a first position extending laterally outwardly from the first bar and a second position located behind the first bar in the normal travel direction of the tractor. In the first position the harvesting device can be operated and in the second position the harvesting device is arranged to be transported. Drive means extend between the first support bar and the second support bar so that the harvesting device can be operated at least in the first position.

In a known forage harvester of this type, note German Offenlegungsschrift No. 21 16 583, the drive involves the use of an angular transmission located at the swivel hinge so that the harvesting device can be swivelled between the operating and transport positions. This angular transmission is driven in the side-mounted position relative to the tractor by a chain or belt drive, located on the first support bar, and driven by the power take-off shaft of the tractor. The harvesting device is driven from the angular transmission by an additional chain or belt drive, mounted on the second support bar, and by an angular transmission located on the harvesting device.

The arrangement of these transmissions with the required pairs of discs, chain wheels and angular gear is very complicated and also quite heavy, so that correspondingly heavy duty suspension support devices are required. Moreover, the separate gear covers needed to prevent contamination and protection from injuries are also complicated.

Therefore, it is the primary object of the present invention to limit the cost of the device by providing a more lightweight type of construction.

In a forage harvester of the type described above, which can be used in the side-mounted position relative to the tractor and also in the transporting position, in accordance with the present invention, a belt drive is used to operate the harvesting device and the belt drive is continuous from a pulley and shaft connection on the first support bar to a pulley and shaft connection on the second support bar connected to the drive shaft of the harvesting device. In the side-mounted position the belt is held on the first and second support bars by a web and bracket arrangement with a part of the web and bracket arrangement being secured to each of the first and second support bars in spaced relation to the swivel hinge so that the belt drive is held securely in place.

To pivot the harvesting device and the second support bar on which it is mounted into the transport position located behind the first support bar and the tractor, in accordance with the present invention, surprisingly it is unnecessary to provide any subdivision of the drive nor any additional means. In the second or transport position, the belt section extending between the webs and brackets is merely bent and slightly twisted.

In another embodiment, the belt pulleys of the belt drive can be shifted by a switching lever into an idling position on a section of the shaft connection, or the pulleys can be provided with free-wheeling in the direction opposite to the driving direction. The drive shaft for the harvesting device is arranged so that in the second or transport position, it aligns with the power take-off shaft of a reversing gear which can also be connected to the tractor power take-off shaft or can be coupled to it. Accordingly, a particularly low cost arrangement is provided which affords an overall low cost and the harvesting device can be used for normal harvesting in the first or side-mounted position and it can be used for clearing a lane in a field in the second or rear-mounted position.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

BRIEF DESCRIPTION OF THE INVENTION

In the drawings:

FIG. 1 is a schematic illustration of one embodiment of the present invention; and FIG. 2 is a schematic illustration of another embodiment of the present invention.

DETAILED DESCRIPTION OF THE INVENTION

Figure 1:
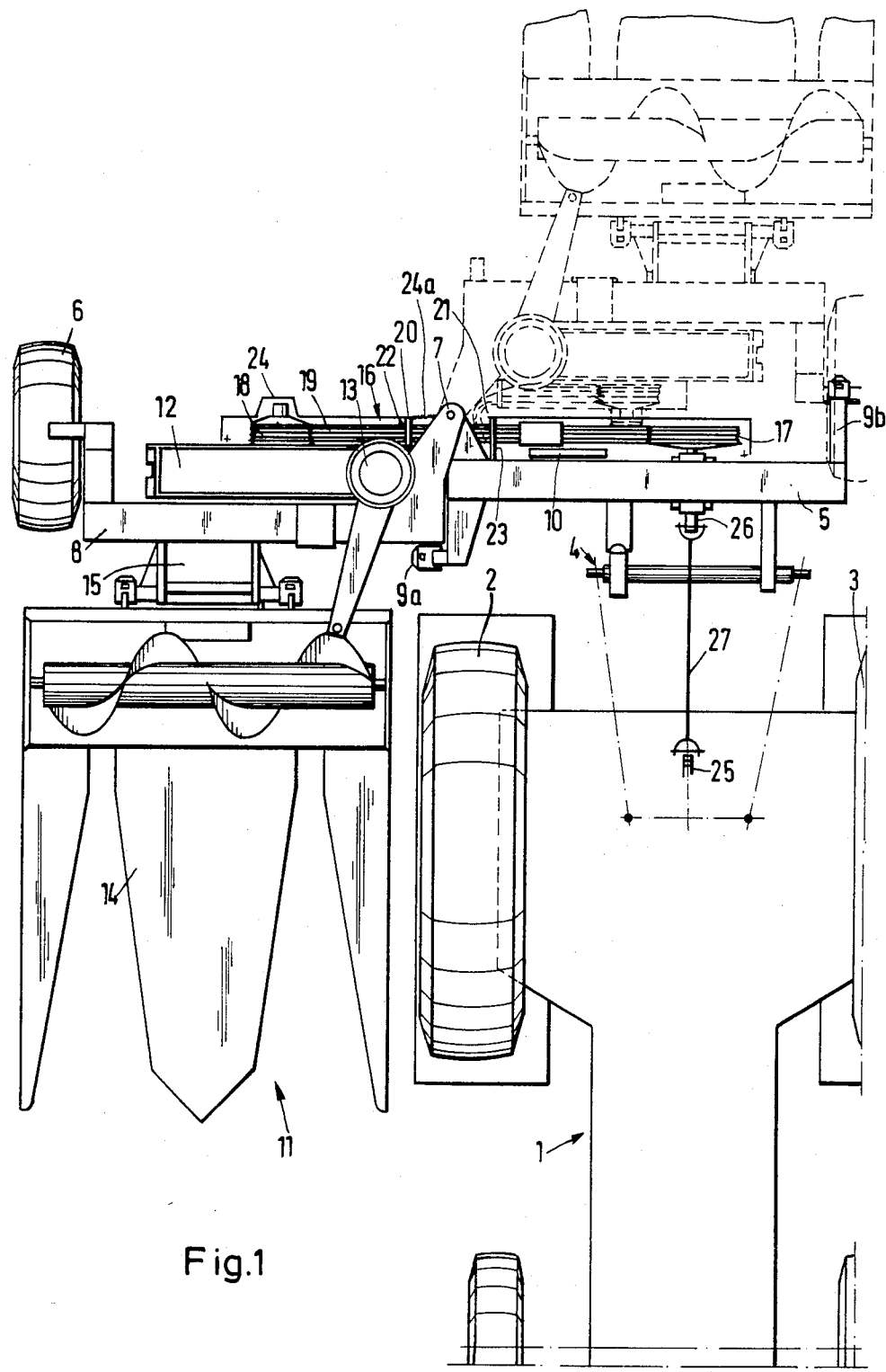

In the drawing, a portion of a tractor 1 is shown with rear wheels 2,3. A three-point connection or attachment linkage 4 extends rearwardly from the tractor to a first support bar 5 of the forage harvester. The first support bar 5 is elongated in the direction extending transversely of the normal forward travel direction of the tractor. The forage harvester includes a support wheel 6 located outwardly from the first support bar 5 in FIG. 1. A hinge 7 pivotally connects a second support bar 8 to the first support bar 5. In the drawing, the second support bar 8 is located in a first position shown in solid line and a second position shown in dashed line. In the first position, the second support bar is side-mounted relative to the tractor, that is, it extends laterally outwardly away from the first support bar. In the first position the second support bar is secured in place by a fixing detent 9a. When the second support bar is pivoted into the second or rear mounted position shown in dashed lines in FIG. 1, it is held by another fixing detent 9b.

Second support bar 8 supports a harvesting device or forage harvester 11 which has a housing 12 aligned parallel to the second support bar and, in the second or rear mounted position, the housing 12 is located between the two supporting bars 5,8. An ejection pipe 13 is connected to the top of the housing 12. The harvesting device 14 is a two-row corn cutter positioned ahead of the second supporting bar 8 in the first or side-mounted position shown in the drawing. The forage harvester 11 is driven by a belt drive consisting of a drive pulley 17 and a driven pulley 18. The drive pulley 17 is located on the first support bar and the driven pulley 18 is supported on the assembly including the second support bar. A belt 19, lined on its inside with V-belts engages into corresponding grooves on the first or drive pulley 17 and the second or driven pulley 18. The belt 19 is held, in both the first and second positions of the harvesting device, on the pulleys 17,18 by means of a web and bracket arrangement. A web 20 and a bracket 22 hold the belt on the second support bar 8 while a web 21 and a bracket 23 hold the belt on the first support bar 5. The brackets mounting the webs on the support bar are located adjacent to the swivel hinge 7. A housing 24 covering and protecting the belt drive 16 includes a flexible material 24a in the section extending between the brackets 22,23. As can be noted, the webs 20,21 and the brackets 22,23 hold the belt even when the second support bar 8 is pivoted into the second or rear-mounted position where the belt 19 is indicated in dashed line.

In the first or side-mounted position of the forage harvester 11, shown in solid line, the second support bar 8 and the harvesting device mounted on it can be easily swivelled from the second or transport position by releasing the fixing detent 9b. In the first position of the second support bar 8, the power take-off shaft 25 of the tractor is connected by a universal joint shaft 27 with a shaft connection 26 for the drive pulley 17.

Figure 2:
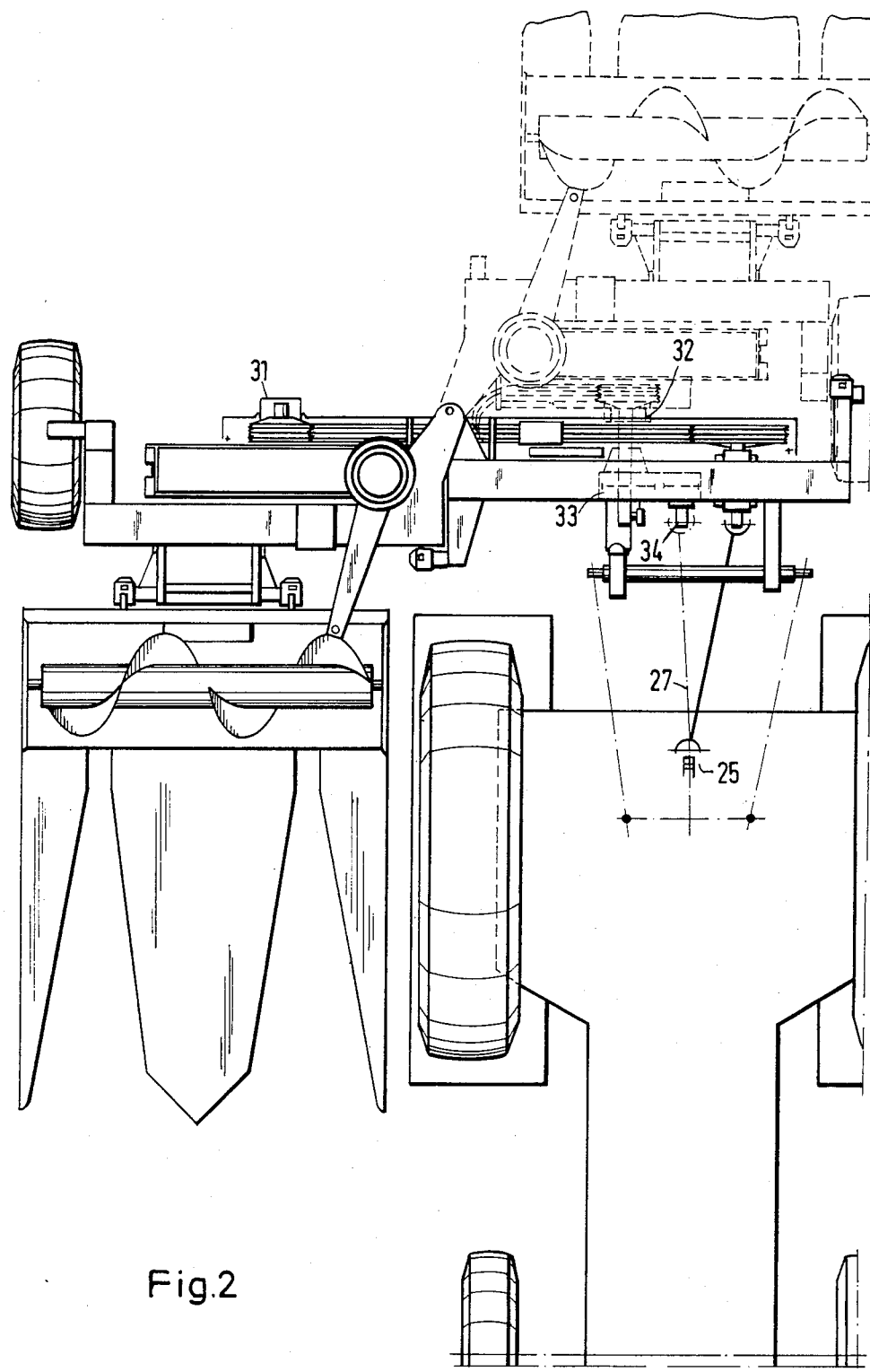

In the embodiment illustrated in FIG. 2, the arrangement in the first operating position is generally the same as shown in FIG. 1. To operate the forage harvester 11 in the second or rear-mounted position where it is also positioned for transport, a hub 31 of the driven belt pulley is constructed in a hollow manner with an inner splined shaft profile and it is automatically coupled with a power take-off connection 32 of a reversing gear 33 when it is moved into the second or rear-mounted position shown in dashed line. A drive shaft connection 34 of the reversing gear 33 can be connected by means of the universal joint shaft 27, as shown in dot-dash line, with the power take-off shaft 25 of the tractor. The belt pulley 18 is constructed for free-wheeling in the second or rear-mounted position. With the forage harvester in the second position on this arrangement it can be driven to clear a lane in a corn field.

In each embodiment, a spring-loaded tension roller 10 effects the linear compensation of the belt 19 when it is swivelled between the first and second positions of the second support bar 8.

In the arrangement shown in FIG. 2, the belt pulleys can be shifted by a switching lever into the idling position.

While specific embodiments of the invention have been shown and described in detail to illustrate the application of the inventive principles, it will be understood that the invention may be embodied otherwise without departing from such principles.

We claim:

1. A multi-row corn cutter forage harvester and/or picker forage harvester, such as a forage harvester of the disk wheel type, comprising an elongated first support bar arranged to be mounted on the three-point attachment linkage of a tractor so that said first support bar extends transversely of the normal forward travel direction of the tractor and has a first end, a second elongated support bar, harvesting means mounted on said second support bar, a lockable swivel hinge interconnecting said second support bar to said first support bar adjacent the first end of said first support bar so that said second support bar can be pivoted about the swivel axis from a first position extending laterally outwardly from the first end of said first support bar where the elongated directions of said first and second support bars extend generally in series whereby said second support bar is in a side-mounted position relative to the tractor and to a second position located behind said first bar in the normal forward travel direction of the tractor so that in the first position harvesting operations can be performed and in the second position the harvesting means are in a transport position, and means for driving said harvesting means at least in the first position, wherein the improvement comprises that said drive means comprises a belt drive including a first shaft connection on and spaced along said first support bar from the swivel axis, a second shaft connection on and spaced along said second support bar from the swivel axis, a first pulley mounted on said first shaft connection, a second pulley mounted on said second shaft connection, a belt extending continuously around said first and second pulleys, said swivel hinge located between and spaced from said first and second pulleys in the first position of said second support bar and said first and second pulleys being located on the same side of said swivel hinge in the second position of said second support bar, means located on said first support bar and on said second support bar, in spaced relation from said swivel hinge, for holding said belt on said first and second pulleys in the first and second positions of said second support bar, said means for holding said belt comprises a first bracket attached to said first support bar and a second bracket secured to said second support bar with said first and second brackets being located closely spaced from said swivel hinge and a first web secured to said first bracket and a second web secured to said second bracket so that said first and second webs engage said belt and retain said belt on said first and second pulleys in the first and second positions of said second support bar.

2. A multi-row corn cutter forage harvester, as set forth in claim 1, wherein a spring-loaded tension roller acts on said belt of said belt drive for effecting the linear compensation of said belt when it is swiveled between the first and second positions of the second support bar.

3. A multi-row corn cutter forage harvester, as set forth in claim 1, including means arranged to connect said harvesting device to the power take-off shaft of the tractor for driving said harvesting device in the second position.

4. A multi-row corn cutter forage harvester, as set forth in claim 3, including means for shifting said first and second belt pulleys into an idling position.

5. A multi-row corn cutter forage harvester, as set forth in claim 3, wherein said second pulley is arranged for free wheeling in the direction opposite to the driving direction.

6. A multi-row corn cutter forage harvester, as set forth in claim 3, wherein said means for driving said harvesting device in the second position comprises a reversing gear mounted on said first support bar, a driven shaft extending from said reversing gear to said harvesting device, and a univeral joint shaft for interconnecting said reversing gear and the power take-off shaft of a tractor.

7. A multi-row corn cutter forage harvester, as set forth in claim 1, including a housing for said belt drive, said housing including a flexible material section located in the region extending between said first and second brackets so that said housing can be pivoted with said second support bar between the first and second positions.

* * * * *